US006947980B1

(12) United States Patent
Knudsen et al.

(10) Patent No.: US 6,947,980 B1
(45) Date of Patent: Sep. 20, 2005

(54) METHOD AND SYSTEM FOR VERIFYING MODEM STATUS

(75) Inventors: Joseph J. Knudsen, Hugo, MN (US); Kory Lasker, Minneapolis, MN (US)

(73) Assignee: Qwest Communications International, Inc., Denver, CO (US)

( * ) Notice: Subject to any disclaimer, the term of this patent is extended or adjusted under 35 U.S.C. 154(b) by 864 days.

(21) Appl. No.: 09/649,864

(22) Filed: Aug. 28, 2000

(51) Int. Cl.[7] ................ G06F 15/173; G06F 15/177; H04M 11/00
(52) U.S. Cl. ............... 709/223; 379/100.6; 709/224; 709/220
(58) Field of Search .............. 707/104.1; 370/463, 370/480, 352; 752/42; 709/232, 223, 224; 379/114.17, 100.6; 382/141; 455/422; 700/21

(56) References Cited

U.S. PATENT DOCUMENTS

| | | | |
|---|---|---|---|
| 6,292,481 B1 * | 9/2001 | Voit et al. ................... 370/352 |
| 6,374,102 B1 * | 4/2002 | Brachman et al. ........ 455/422.1 |
| 6,430,275 B1 * | 8/2002 | Voit et al. ............... 379/114.17 |
| 6,463,552 B1 * | 10/2002 | Jibbe ........................... 714/33 |
| 6,480,748 B1 * | 11/2002 | Gerszberg et al. ............ 700/21 |
| 6,501,849 B1 * | 12/2002 | Gupta et al. ................. 382/141 |
| 6,522,668 B1 * | 2/2003 | Singleton et al. ........... 370/480 |
| 6,529,743 B1 * | 3/2003 | Thompson et al. .......... 455/557 |
| 6,580,727 B1 * | 6/2003 | Yim et al. ................... 370/463 |
| 2002/0004798 A1 * | 1/2002 | Babula et al. ............ 707/104.1 |
| 2003/0208614 A1 * | 11/2003 | Wilkes ........................ 709/232 |
| 2003/0208758 A1 * | 11/2003 | Schein et al. ................. 725/42 |

* cited by examiner

Primary Examiner—Dung C. Dinh
Assistant Examiner—Chad Zhong
(74) Attorney, Agent, or Firm—Townsend and Townsend and Crew LLP

(57) ABSTRACT

A system for verifying modem status for a telecommunications service provider in a broadband network serviced by a central office. The system comprising an internet interface for receiving a modem status request from the telecommunications service provider via a telecommunications network and an integrator capable of retrieving subscriber information and a server connected to the internet interface for receiving the modem status request and transmitting the modem status request to the integrator. The integrator interprets the modem status request and retrieves corresponding subscriber information and transmits the corresponding subscriber information to the server, the server thereby converting the corresponding subscriber information to a central office request and sending the central office request to the central office. The central office responding to the request and transmitting a status signal to the server and the server transmitting the signal to the internet interface which converts the status signal to a readable format for the telecommunications service provider.

20 Claims, 4 Drawing Sheets

| Name | Phone |
|---|---|
| DAENZER, BARBARA | 6128240534 |
| KILLION, KYLE | 612 790-2293  CBR  612 |
| AARON FLORIN | 612-333-0774  EXT., AARON |
| JEFF OWENS | 612-930-1060  EXT., JEFF |
| E J LINCK | 612-379-3805  EXT. 107, |
| TERRY BYRNES | 612-890-8196  EXT., TERRY |
| M S GJETSON | 651-488-7852 |
| KEVIN CALLINAN | 651-774-4593  EXT., KEVIN |
| TIM ZAPPIA | 612-937-4422  EXT., TIM |
| DENNIS LOUDEN | 651-698-8559  EXT., DENNIS |
| MASON, EUGENE | 6516984782  6513785137 |

FIG. 3

METHOD AND SYSTEM FOR VERIFYING MODEM STATUS

TECHNICAL FIELD

This invention relates to a method and system for verifying modem status for a telecommunication system and more particularly to verifying modem status in real-time of an internet subscriber service.

BACKGROUND ART

Digital Subscriber Line signal architectures, generally denoted as DSL, provide simultaneous voice and high-speed data services over a signal copper wire pair. DSL allows data transmission at speeds much faster than the best available analog modems. There exist several variations of DSL systems that use copper wire cabling to move data between the site and the serving central office. Data, voice and video are separated at the serving central office. Voice is delivered to the public switched telephone network while data is delivered to the host destination over high speed service access links.

As an example, ADSL or Asymmetric Digital Subscriber Line services generally use existing unshield twisted pair (UTP) copper wires from a telephone company's central office to the subscriber's premise, utilize electronic equipment in the form of ADSL modems at both the central office and the subscriber's premise, send high-speed digital signals up and down those copper wires, and send more information one way than the other. The ADSL type of DSL services is capable of providing a downstream bandwidth of approximately 1.5 Mbps–8 Mbps, and upstream bandwidth of about 16 Kbps–64 Kbps with loop distances ranging from about 3.7 km–5.5 km. DSL or High bit rate Digital Subscriber Line services provide a symmetric, high performance connection over a shorter loop, and typically require two or three copper twisted pairs. DSL is capable of providing both upstream and downstream bandwidth of approximately 1.5 Mbps, over loop distances of up to approximately 3.7 km. DSL or single line digital services provide a symmetric connection that matches DSL performances using a single twisted pair, but operating over a shorter loop of up to approximately 3.0 km.

DSL services are typically implemented in an asymmetric form having a downstream transmission capability of approximately 52 Mbps over twisted pair copper wire arranged in local loops of 300 m, 26 Mbps at 1,000 m, and 13 Mbps at 1,500 m. Upstream data rates in asymmetric implementations tend to range from approximately 1.6 Mbps to approximately 2.3 Mbps. As though skill in the art will recognize, a typical distribution system includes a central office equipped with a Host Digital Terminal (HOT) and arranged to operate as a hub between multiple Video Information Providers (VIPs)/Digital Service Providers (DIPS) and customer residential dwellings. In a Fiber-To-The-Neighborhood (FTN) type distribution system, optic fiber (e.g. OC-3c and OC-12c) lines are used to connect the central office to a Universal System Access Multiplexer (USAM), which is then connected to a Network Interface Device (NID) located on the customer property via twisted pair copper wire. A dedicated DSL loop extends between the NID and an individual customer residence using an existing POTS or telephone system twisted pair wire, and a customer interface device, such as a residential gateway or set top box, provides a connection point for a customer display device such as a television or personal computer. A Fiber-To-The-Curb (FTTC) type distribution system is similar except that a Broadband Network Unit (BNU) is used in place of the USAM, and coaxial cable is used to connect the BNU, NID, and set top box.

The DSL signal format is used to carry signals to and from the customer. In these systems, the central office provisions each user for programming access rights, and maintains a profile database for each provisioned customer at the HOT to control the signals/channels that can be viewed by the customer.

The improvements in DSL technology are reducing access costs and increasing DSL subscribers. Improvements in access speed and ease of use are making DSL attractive for home, small business and some large business users. Full time access or connectivity has reduced call set-up time delay and eliminates getting "bumped" off the network. DSL speeds may vary from part time 256 Kps speeds to 7 Mbps downstream/upstream for intensive business users. Further improvements in DSL's is allowing high-speed digital communications connections on voice lines. Subscribers have the ability to continue making voice calls while transmitting data, receiving files or working on the Internet.

Due to the improvements noted, more and more subscribers are connecting to the Internet via DSL connections. It has become important for Internet Service Providers (ISP's) to provide better and faster service. As the ISP is the connection from the subscriber to the Internet, the subscriber is reliant on the ISP for any utilization of the Internet or network related service using the DSL. The ISP service ideally wishes to limit downtime due to faulty connections to a minimum. Currently, the ISP is blind to a subscriber's connection status. If a connection issue occurs for any reason, the customer is dependent upon the ISP to assist in troubleshooting the connection. The ISP initially may trouble shoot at the ISP end but is often required to phone the DSL service and request status. This phone request is very time consulting for the ISP as well as for the DSL service provider. Further, multiple requests for status are often difficult to satisfy for the DSL provider. In some circumstances real time responses are very difficult due to numerous status requests from multiple ISP's.

New subscriber connection status is as important as current subscriber connection status. New subscribers often have multiple hardware and software related concerns that must be addressed for proper DSL connections status. Having an accurate real-time status of the DSL connection is very useful in new subscriber connection troubleshooting. Consequently, a need has developed for a method and system for verifying modem status.

DISCLOSURE OF INVENTION

It is the principal object of the present invention to provide a method and system for verifying modem connection via an internet website.

It is another object of the present invention to provide an ISP with the capability to check modem status in real-time via known website interface technology.

It is still another object of the present invention to provide an ISP with the capability to troubleshoot modem connections by allowing the ISP to independently verify customer connections at the DSLAM of the respective central office.

In carrying out the above objects, there is provided a method for verifying modem status for a telecommunications service provider in a communications network serviced by a central office. The method comprises connecting to an internet interface and transmitting a modem status request to the internet interface. The modem status request is transferred from the internet interface to a server and subsequently transmitted to an integrator whereby the integrator interprets the modem status request and retrieves corresponding subscriber information. The corresponding subscriber information is transferred to the server and then converted to a central office request and eventually sent to the central office. The request queries modem status of a customer and creates a status signal which is transmitted back to the server. The server transmits the status signal from the server to the internet interface and converts the status signal to a readable format for the telecommunications service provider indicating status as "trained", "not trained" or "training".

In carrying out the above method, there is provided a system that automates the above steps. The system comprises a web server having an internet website interface for receiving a modem status request from the internet service provider via the internet, an integrator capable of retrieving subscriber location information and a status server connected to the web server for receiving the modem status request and transmitting the request to the integrator whereby the integrator interprets the modem status request and retrieves corresponding subscriber location information. The integrator transmits the corresponding subscriber information to the status server and the status server thereby converts the corresponding subscriber information to a central office DSLAM request and sends the central office DSLAM request to the central office DSLAM. The central office DSLAM responds to the request and transmits a status signal to the status server and the status server transmits the signal to the webserver which converts the signal to a readable format on the internet website interface for viewing by the internet service provider.

These and other objects, features, and advantages of the present invention will become more readily apparent by reference to the following description of the drawings wherein like reference numerals correspond to like components.

BRIEF DESCRIPTION OF DRAWINGS

FIG. 3 is a representative web interface illustrating DSL subscribers; and

BEST MODE FOR CARRYING OUT THE INVENTION

Figure 1:
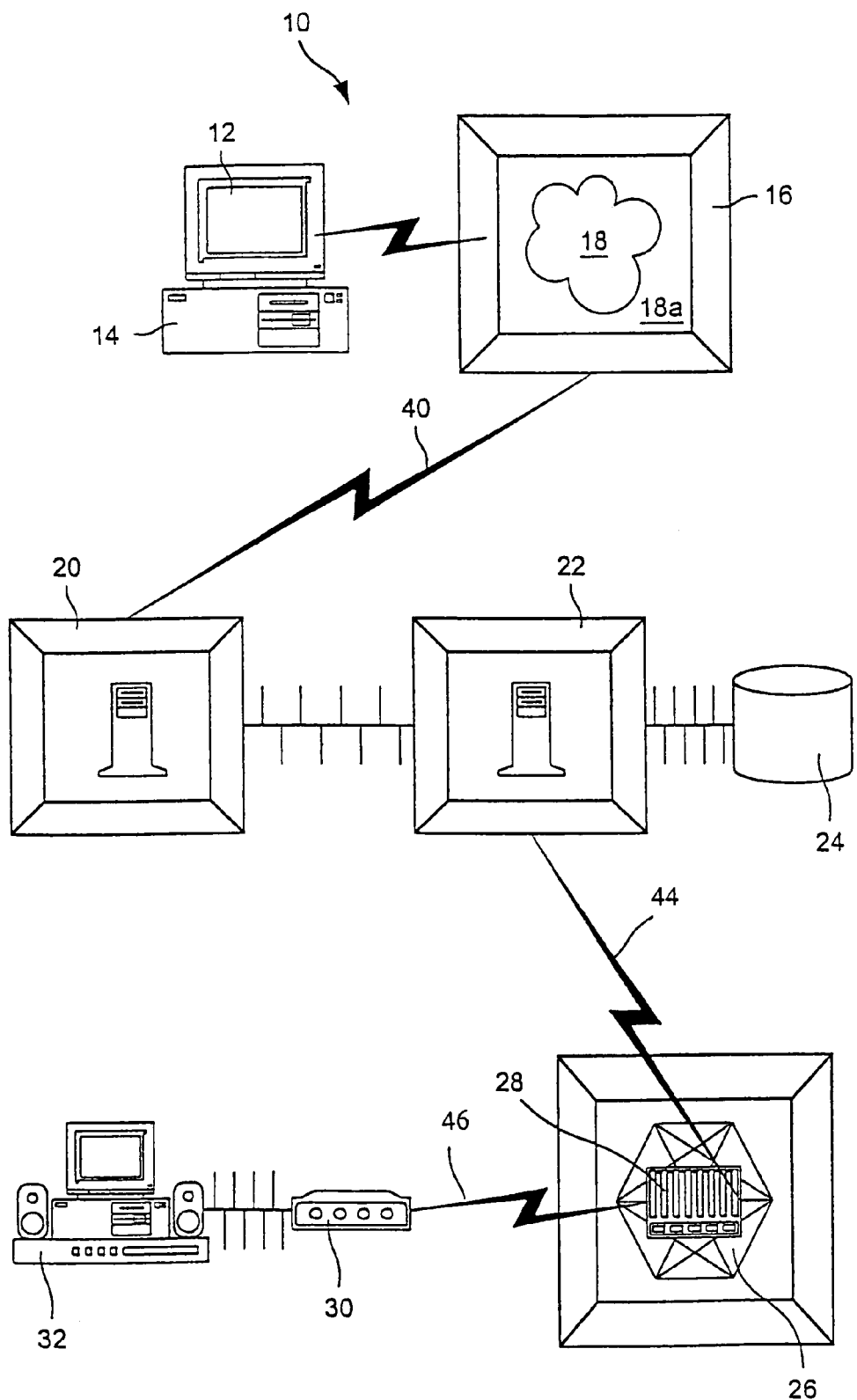
FIG. 1 is a schematic diagram of the system for verifying modem status of the present invention.

With reference to FIG. 1 of the drawings, there is shown a generalized schematic of the system 10 of the present invention. As discussed above, when an ISP 12, using a computer system 14 desires to check modem status, the ISP 12 connects to the Internet 16 via common Internet connections methods. The ISP will connect up to the appropriate internet interface or internet web site 18 by having the appropriate Internet addresses previously provided by the DSL service provider or by using appropriate search techniques if necessary. The internet web site 18 is resident on a web server 20. Any common web server such as the Apache Group's Apache Web Server or MICROSOFT's Internet Information Services (IIS) envisioned for the web server 20 system component.

Web server 20 is connected and in communication with status server 22. Status server 22, in the preferred embodiment is a UNIX inetd server that is capable of listening on a UNIX socket (port 7895) on two production servers. The status server 22 is connected and in communication with a database 24. The database 24, in the preferred embodiment contains useful customer information. As shown in FIG. 1, status server 22 is capable of communicating with a DSLAM 26 at the central office 28. The DSLAM 26 is in communication with the DSL modem 30 which is connected to the ultimate customer or subscriber 32.

Figure 2:
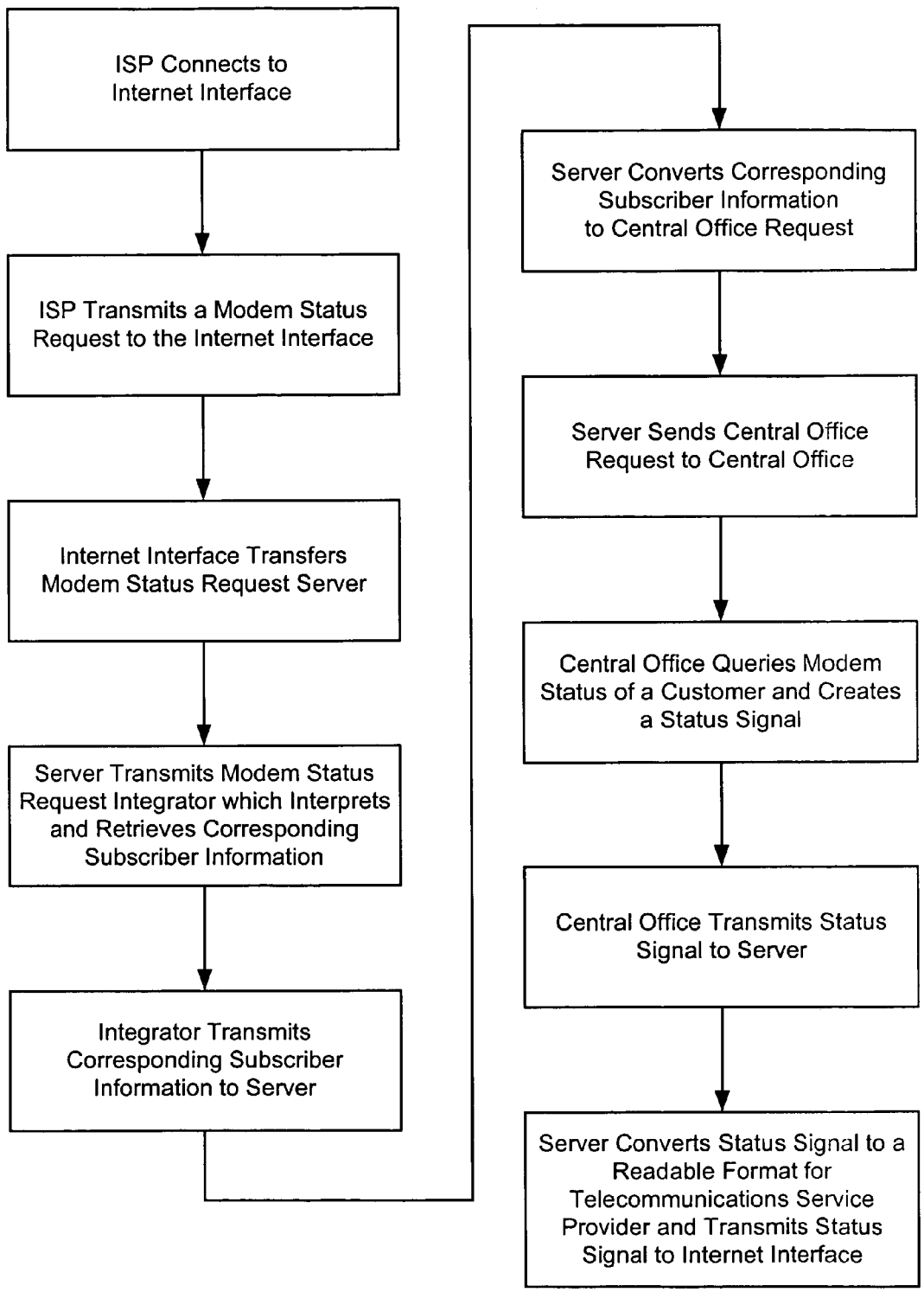
FIG. 2 is a flow diagram of the method for verifying modem status of the present invention.

In the preferred embodiment, the method as described in FIG. 2, comprises using a digital broadband network serviced by a central office 26. The ISP 12 connects to webserver 20 using having an internet website interface 18. As shown in FIG. 3, the website interface 18 includes a list 34 of telecommunications service provider customers 36. Each customer 36 has a corresponding phone number 38. In this manner the ISP can easily designate the appropriate customer 36 from the list 34. If a customer calls the ISP with trouble in connection, the ISP can begin the trouble shooting procedure by picking or designating from the list 34 the appropriate customer. In choosing the customer from the list 34, the ISP has through the use of the website interface 18 transmitted a modem status request 40 to the webserver 20 via the website interface 18.

The webserver 20 transfers the modem status request 40—from the webserver 20 to a status server 22. As discussed above, the status server, in the preferred embodiment is a UNIX inetd server. The status server 22 handles multiple simultaneous requests in real time. The modem status request 40, now in the form of a telephone number 38 is transmitted from the status server 22 to an integrator 24. The status server does what is known in the art as SQL to the integrator 24. The integrator 24 interprets the modem status request 40 in the form of phone number 38 and retrieves corresponding subscriber location information. This subscriber location information may be in the form of customer node and port records for which the DSLAM 28 the customer 12 is provisioned on. The integrator 24 transmits the customer node and port records or corresponding subscriber location information to the status server 22.

The status server converts the corresponding subscriber location information to a central office DSLAM request 44. In the art, the central office DSLAM request 44 is also known as a SNMP request. This central office DSLAM request 44 is sent to the corresponding central office DSLAM 28. This request queries the modem status of a customer for whom the DSLAM creates a status signal. This status signal 46 is related to the status of the modem and is "connected", "not connected" or "connecting" or also known as "trained", "not trained" or "training". Status signal 46 is transmitted to status server 22. Status server 22 transmits the status signal 46 from the status server 22 to the web server 20 all in real time.

Figure 4:
FIG. 4 is a representative web interface illustrating modem status.

The webserver 20 converts the status signal 46, to a website interface 18a, as shown in FIG. 4 which is in a readable format. More specifically, the status of "trained", "not trained" or "training" is viewable in a graphical and textual format which is easily readable by the ISP. This real time information greatly enhances the ISP trouble shooting and set-up capabilities for use with the customer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention

What is claimed is:

1. A system for verifying modem status for a telecommunications service provider in a broadband network serviced by a central office, the system comprising:
   an internet interface for receiving a modem status request from the telecommunications service provider via a telecommunications network;
   an integrator capable of retrieving subscriber information; and
   a server connected to said internet interface for receiving said modem status request and transmitting said modem status request to said integrator whereby said integrator interprets said modem status request and retrieves corresponding subscriber information and transmits said corresponding subscriber information to said server, said server thereby converting said corresponding subscriber information to a central office request and sending said central office request to said central office, said central office responding to said request and transmitting a status signal to said server and said server transmitting said signal to said internet interface which converts said status signal to a readable format for said telecommunications service provider.

2. The system of claim 1 wherein said internet interface is a web server having an internet web site resident therein containing a list of telecommunications service provider customers.

3. The system of claim 2 wherein said modem status request is a designation of a customer from said list of telecommunications service provider customers.

4. The system of claim 3 wherein said modem status request is a telecommunications service provider customer telephone number.

5. The system of claim 4 wherein said subscriber information is customer node and port records.

6. The system of claim 1 wherein central office includes a Digital Subscriber Line Access Multiplexer (DSLAM) and said central office request is a Simple Network Management Protocol (SNMP) request corresponding to the DSLAM.

7. The system of claim 1 wherein said readable format for said telecommunications service provider is a web site interface.

8. The system of claim 1 wherein said status signal includes a status from a list of connected, not connected or connecting.

9. The system of claim 1 wherein said status signal is provided to said telecommunications service provider in real-time.

10. The system of claim 1 wherein said server is capable of receiving multiple status requests.

11. A system for verifying modem status for an internet service provider in a digital broadband network serviced by a central office, the system comprising:
    a web server having an internet website interface for receiving a modem status request from the internet service provider via the internet;
    an integrator capable of retrieving subscriber location information;
    a status server connected to said web server for receiving said modem status request and transmitting said request to said integrator whereby said integrator interprets said modem status request and retrieves corresponding subscriber location information and transmits said corresponding subscriber information to said status server, said status server thereby converts said corresponding subscriber information to a central office Digital Subscriber Line Access Multiplexer (DSLAM) request and sends said central office DSLAM request to said central office DSLAM, said central office DSLAM responds to said request and transmits said signal to said webserver which converts said signal to a readable format on said internet website interface for viewing by said internet service provider.

12. A method for verifying modem status for a telecommunications service provider in a communications network serviced by a central office, the method comprising:
    connecting to an internet interface;
    transmitting a modem status request from the telecommunications service provider to the internet interface;
    transferring said modem status request from the internet interface to a server;
    transmitting said modem status request from said server to an integrator whereby said integrator interprets said modem status request and retrieves corresponding subscriber information;
    transmitting said corresponding subscriber information to said server;
    converting, at the server, said corresponding subscriber information to a central office request;
    sending said central office request to said central office;
    querying, from the central office, a modem status of a customer and creating a status signal;
    transmitting said status signal to said server;
    transmitting said status signal from said server to said internet interface; and
    converting said status signal to a readable format for said telecommunications service provider.

13. The method of claim 12 wherein connecting to said internet interface further comprises connecting to a web server having an internet web site resident therein containing a list of telecommunications service provider customers.

14. The method of claim 13 wherein transmitting said modem status request further comprises designating of a customer from said list of telecommunications service provider customers.

15. The method of claim 12 wherein converting said corresponding subscriber information to the central office request further comprises converting said corresponding subscriber information to a SNMP request corresponding to a DSLAM located at the central office.

16. The method of claim 12 wherein converting said status signal to the readable format for said telecommunications service provider further comprises converting the status signal to a web site interface screen indicating a status in real time.

17. A method for verifying modem status for an internet service provider in a digital broadband network serviced by a central office, the method comprising:
    connecting to a webserver having an internet website interface;
    transmitting a modem status request to the webserver via said internet website interface;
    transferring said modem status request from the webserver to a status server;
    transmitting said modem status request from said status server to an integrator whereby said integrator interprets said modem status request and retrieves corresponding subscriber location information;
    transmitting said corresponding subscriber location information to said status server; converting said corresponding subscriber location information to a central office Digital Subscriber Line Access Multiplexer (DSLAM) request;

sending said central office DSLAM request to said central office;

querying modem status of a customer and creating a status signal;

transmitting said status signal to said server;

transmitting said status signal from said status server to said web server; and converting said status signal at said web server to a website interface for communication to said internet service provider.

18. The method of claim 17 wherein converting said status signal to a website interface for communication to telecommunications service provider further comprises converting the status signal to a web site interface screen indicating a status in real time for viewing via an internet connection.

19. The system of claim 1, wherein the telecommunications service provider is an Internet Service Provider (ISP).

20. The method of claim 12, wherein the telecommunications service provider is an Internet Service Provider (ISP).

* * * * *